United States Patent [19]
Leseman et al.

[11] Patent Number: 5,145,544
[45] Date of Patent: Sep. 8, 1992

[54] METHOD FOR PREPARING TAPE HAVING IMPROVED TEAR STRENGTH

[75] Inventors: Ronald P. Leseman, Newport; Thomas L. Wood, Maplewood, both of Minn.

[73] Assignee: Minnesota Mining and Manufacturing Company, St. Paul, Minn.

[21] Appl. No.: 708,239

[22] Filed: May 31, 1991

Related U.S. Application Data

[62] Division of Ser. No. 386,202, Aug. 1, 1989, Pat. No. 5,080,957.

[51] Int. Cl.$^5$ .............................. B29C 47/02
[52] U.S. Cl. ......................... 156/229; 156/244.12; 156/244.19; 156/244.27; 264/171; 264/210.2
[58] Field of Search ............... 264/171, 167, 210.2; 156/244.11, 229, 244.12, 244.19, 244.25, 244.27

[56] References Cited

U.S. PATENT DOCUMENTS

| | | | |
|---|---|---|---|
| 2,750,314 | 6/1956 | Bemmels | 428/354 |
| 2,750,315 | 6/1956 | Tierney | 154/53.5 |
| 2,750,316 | 6/1956 | Bemmels | 428/295 |
| 2,753,285 | 7/1956 | Pahl et al. | 428/295 |
| 3,034,941 | 5/1962 | Hessenthaler et al. | 264/171 |
| 3,179,552 | 4/1965 | Hauser et al. | |
| 3,310,453 | 3/1967 | Lappala et al. | |
| 3,445,319 | 5/1969 | Dawbarn | 428/294 |
| 3,449,187 | 6/1969 | Bobkowicz | |
| 3,485,912 | 12/1969 | Schrenk et al. | 264/171 |
| 3,700,536 | 10/1972 | Bentvelzen et al. | |
| 3,793,130 | 2/1974 | Marzucchi | 428/295 |
| 3,833,703 | 9/1974 | Joos | 264/167 |
| 3,873,409 | 3/1975 | Jehler | |
| 3,888,805 | 6/1975 | Van Gils et al. | 428/295 |
| 3,896,253 | 7/1975 | Elmer | |
| 3,919,377 | 11/1975 | Dow et al. | 264/147 |
| 3,922,422 | 11/1975 | Wise | |
| 4,033,709 | 7/1977 | Kroyer | |
| 4,083,914 | 4/1978 | Schlippers et al. | 264/147 |
| 4,101,620 | 7/1978 | Kops et al. | 264/177.16 |
| 4,260,441 | 4/1981 | Prewo | |
| 4,315,963 | 2/1982 | Havens | 428/35 |
| 4,379,806 | 4/1983 | Korpman | 264/171 |
| 4,379,814 | 4/1983 | Tsien et al. | 264/171 |
| 4,397,905 | 8/1983 | Dettmer et al. | 428/180 |
| 4,434,204 | 2/1984 | Hartman et al. | 428/294 |
| 4,440,819 | 4/1984 | Rosser et al. | |
| 4,454,184 | 6/1984 | Britton | 428/295 |
| 4,454,192 | 6/1984 | Suzuki | |
| 4,499,040 | 2/1985 | Maemoto et al. | 264/167 |
| 4,536,362 | 8/1985 | Donaldson | |
| 4,565,725 | 1/1986 | Spamer | 264/177.1 |
| 4,575,444 | 3/1986 | Paradis | 264/167 |
| 4,592,938 | 6/1986 | Benoit | 156/244.15 |
| 4,592,938 | 6/1986 | Benoit | |
| 4,605,366 | 8/1986 | Lehmann et al. | |
| 4,713,283 | 12/1987 | Cogswell | 428/294 |
| 4,720,366 | 1/1988 | Binnersley et al. | |
| 4,731,280 | 3/1988 | Geisseler | |
| 4,770,490 | 9/1988 | Gruenewold et al. | 428/295 |
| 4,816,316 | 3/1989 | Robbins, III | |
| 4,923,551 | 5/1990 | Wagers et al. | 264/177.1 |

FOREIGN PATENT DOCUMENTS

| | | |
|---|---|---|
| 0255375 | 7/1986 | European Pat. Off. |
| 0343896 | 11/1989 | European Pat. Off. |
| 1945918 | 4/1970 | Fed. Rep. of Germany |
| 2019815 | 11/1970 | Fed. Rep. of Germany |
| 2223780 | 11/1973 | Fed. Rep. of Germany |
| 3213246 | 6/1983 | Fed. Rep. of Germany |
| 00227386 | 9/1985 | Fed. Rep. of Germany 428/294 |
| 1336680 | 7/1963 | France |
| 2455967 | 12/1980 | France |
| 1117751 | 6/1965 | United Kingdom |
| 1178438 | 1/1970 | United Kingdom |

OTHER PUBLICATIONS

European Search Report.

Primary Examiner—Jeffery Thurlow
Attorney, Agent, or Firm—Gary L. Griswold; Walter N. Kirn; David L. Weinstein

[57] ABSTRACT

Method for preparing a tape having a backing bearing on at least one major surface thereof a plurality of ribs disposed substantially longitudinally thereon, and further bearing on at least one major surface thereof a layer of adhesive. The ribs are joined to the backing such that there exists a notch-like separation between each end of the rib and the surface of the backing. No more than 50% of the cross-section of the ribs should project from the rib-bearing surface of the tape. It is preferred that the adhesive be a pressure-sensitive adhesive. The tape of this invention can be prepared by means of coextrusion techniques.

8 Claims, 5 Drawing Sheets

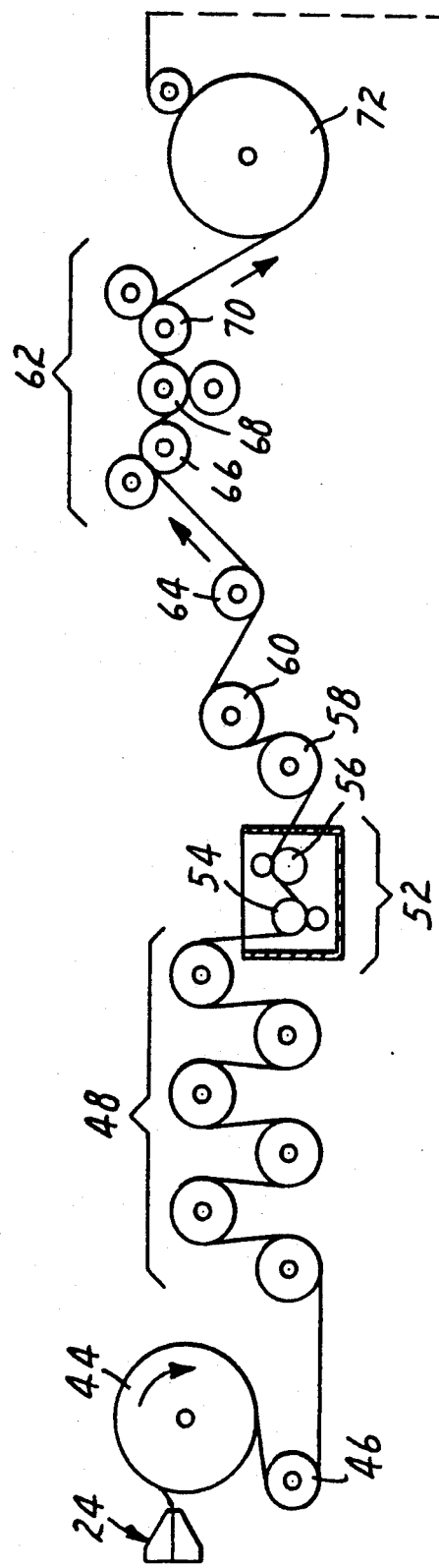
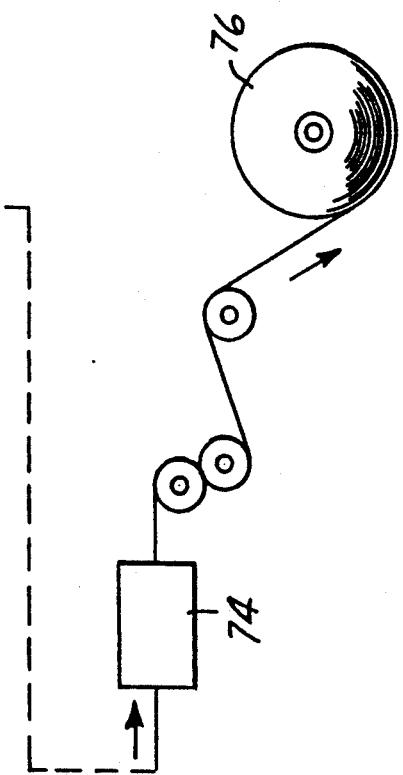
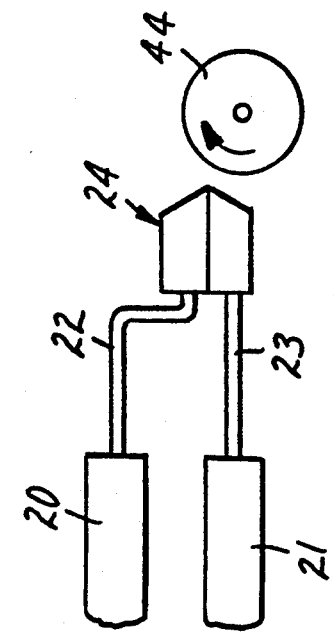
FIG. 3
FIG. 2

METHOD FOR PREPARING TAPE HAVING IMPROVED TEAR STRENGTH

This is a division of application Ser. No. 07/386,202 filed Aug. 1, 1989, now U.S. Pat. No. 5,080,957.

BACKGROUND OF THE INVENTION

1. Field of the Invention

The present invention relates to reinforced pressure-sensitive adhesive tapes, and to a method for making these tapes.

2. Description of the Prior Art

Reinforced tapes, also known as filament tapes, generally comprise a backing having adhered to one major surface thereof a plurality of yarns, which comprise a multiplicity of glass or synthetic polymeric filaments, by means of an adhesive. Alternatively, the yarns can be replaced by individual filaments. Typically, a layer of pressure-sensitive adhesive is then applied over the yarn- or filament-bearing surface of the tape. Filament tapes can be made by applying continuous filaments or yarns drawn from warp beams or spools to a substrate, e.g., a film or paper backing. U.S. Pat. No. 2,750,315 discloses a process in which a film or paper backing is first coated with an adhesive solution and then dried sufficiently to remove the bulk of the solvent. Then, synthetic polymeric yarns are laminated to the backing. The yarn-bearing backing is then coated with a second adhesive solution and then dried again. The finished tape is then wound into a jumbo roll, slit, and wound into tape rolls in a conventional manner. This method is also applicable to untwisted mono-fiber filaments. During all of these steps, many problems can occur. One of the most common problems is breakage of the filaments from the warp beams during the lamination step. Much time must be spent during initial set-up to thread the individual yarns from the warp beam into the yarn combs in order to provide proper alignment of yarns during the laminating step. The processing of hundreds of yarns, which are very fragile, is difficult. Selection of optimum process conditions, such as yarn tension, adhesive coating, and lamination, is critical to minimize waste and rework. Another problem is compatibility of the adhesive systems with the yarns of the tape. Although the adhesive does surround the individual yarns which are comprised of bundles of filaments, it does not coat each individual filament. This can result in a poor bond between the adhesive and the surface of the filament.

U.S. Pat. No. 4,592,938 discloses a method for producing an internally reinforced film web through coextrusion of two polymeric materials. Tensile strength is enhanced by means of flat reinforcing strips embedded within the matrix material of the film web in the longitudinal direction of the film web. The primary use of the film is to reinforce plastic bags and components thereof.

U.S. Pat. No. 4,536,362 discloses a process for making a plastic film having longitudinal ribs by extrusion of a resin through a pair of spaced die lips. One of the die lips is provided with slots which runs at an angle to the direction of flow of resin across the die lips. Impurities in the resin are collected by and retained in the slots provided in one of the die lips. This occurs because of the shear stress field created by the arrangement of the slots during the extrusion process; consequently, all the impurities in the resin are collected and contained in the thickened rib portion of the film, thus reducing the deleterious effects of the impurities upon film performance.

U.S. Pat. No. 4,454,192 discloses a process of making a pressure-sensitive sheet adhesive tape by burying a plurality of artificial filament yarns in the sheet and then embedding the filament yarns with a suitable adhesive. The artificial yarns are buried in one side of the sheet so that at least half of the sections of filament yarns are exposed to permit embedding in the adhesive layer. This procedure is subject to many of the same mechanical processing problems which involve application of yarns onto a tape backing, e.g., yarn breakage, loss of equipment run time, and quality of the material.

Although filament tapes are extremely useful, the cost of making them is high because of the high cost of filaments and the high cost of processing. In order to reduce the cost of making filament-reinforced tapes, some manufacturers have resorted to reducing the number of filaments adhered to the backing. However, this expedient reduces the tear strength of the tape.

While high quality filament-reinforced tapes are known to have an extremely high level of tear strength, they are generally used only once, thus making their use costly to the consumer. It is, therefore, desired to have a tape having a reasonably high level of tear strength, but at a much lower cost than that of high quality filament-reinforced tapes.

SUMMARY OF THE INVENTION

This invention provides a tape comprising a backing having at least partially embedded in at least one major surface thereof a plurality of ribs disposed substantially longitudinally thereon and further bearing on at least one major surface thereof a layer of adhesive. As used herein, the term "tape" encompasses both tapes produced in wide widths and tapes slit to narrower widths. Both the backing and the ribs are made of polymeric material.

In the preferred embodiment, the ribs are formed separately from the backing, attached to the backing while both are in a softened condition, and subsequently embedded into the backing without further fusing with the backing beyond the fusion achieved during attachment. Between each end of each rib and the surface of the backing is a notch-like separation, which results from the embedding process. It has been found that this separation can be formed when at least 50% of the cross-section of the rib is disposed below the surface of the backing.

In the preferred embodiment, the layer of adhesive is made of a pressure-sensitive adhesive. The tape provides improved tear strength in the cross direction compared to conventional flat tapes. The tape also provides high strength in the machine direction. The cost of this tape is much lower than that of conventional filament reinforced tapes.

The tape of this invention is preferably prepared by means of coextrusion. There are at least two excellent embodiments involving coextrusion. Both embodiments involve the following steps: (1) delivering the material for the backing to the extrusion die by way of one extruder and the material for the ribs to the extrusion die by way of a second extruder; (2) extruding both materials through the die onto a driven chilled roll, the molten rib material touching and bonding to the molten backing material; (3) orienting the rib-bearing article in the machine direction by way of molecular orientation; (4) embedding the ribs into the backing to a sufficient depth to form a notch-like separation between each end of the rib and the surface of the backing; and (5) coating a layer of adhesive on at least one major surface of the oriented rib-bearing article.

In one embodiment, a first molten resin and a second molten resin are extruded through a single manifold die having a slot having elongated sides, with a plurality of small openings formed along at least one of said elongated sides. By means of this method, the ribs and the backing are extruded from the same die simultaneously. In a second embodiment, a first molten resin is extruded through the first manifold of a dual manifold die having a slot with elongated sides to form the backing. A second molten resin is extruded through the second manifold of a dual manifold die having a plurality of openings to form the ribs. The extruded ribs are directed to the backing and fuse therewith to form a rib-bearing backing. Preferably, the ribs are directed to the backing by means of gravity. In either embodiment, the backing is then softened sufficiently to allow a major portion of each of the unsoftened ribs to be disposed below the surface of the backing, preferably by means of a calendering process.

BRIEF DESCRIPTION OF THE DRAWINGS

FIG. 2 shows a schematic diagram of the extruding system of the present invention.

FIG. 3 shows a schematic diagram of the system used to extrude, orient, and wind up the tape of the present invention.

DETAILED DESCRIPTION OF THE INVENTION

Figure 1:
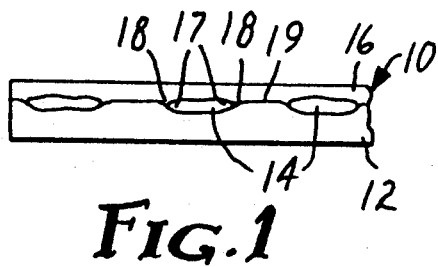
FIG. 1 shows one embodiment of a cross section of the tape of the present invention.

Referring to FIG. 1, the tape 10 of this invention comprises a backing 12 having at least partially embedded in at least one major surface thereof a plurality of ribs 14 that extend substantially longitudinally in the machine direction thereon. On at least one major surface of the tape 10 is disposed a layer of adhesive 16, preferably pressure-sensitive adhesive.

Backing 12 can be formed from any extrudable film-forming polymeric material. Polymeric materials suitable for the backing include polyesters, such as polyethylene terephthalate and polybutylene terephthalate; polyolefins, such as polyethylene and polypropylene; copolymers of olefins, such as copolymers of ethylene and propylene; mixtures of polyolefins; vinylidene chloride-vinyl chloride polymers; vinyl chloride polymers, such as copolymers of vinyl chloride and vinyl acetate; polyvinyl alcohols; polyamides, such as nylon; flexible acrylates and methacrylates.

The thickness of backing 12 preferably ranges from about 0.0127 mm to about 0.254 mm. Backing 12 is preferably sufficiently flexible so that it can be wound into a roll.

Ribs 14 can be formed from any extrudable polymeric material. Suitable materials include the same materials that can be used to form the backing. Thickness, diameter, or cross-sectional dimensions, of ribs 14 is determined by the shape of the die orifice opening, the relative die angle, the position or location of the orifice openings, the rate of draw on the extrudate, the rate of quenching of the material leaving the die orifice, and the longitudinal stretch ratio. All of these parameters are well-known to those of ordinary skill in the art of extrusion. It is preferred that there be at least 10, more preferably at least 20, most preferably at least 25 ribs per inch width of backing.

The backing is characterized by having a plurality of indentations, each of which is occupied by a rib. A maximum of 50% of the cross-section of the rib can protrude above the rib-bearing surface of the backing. The less each rib protrudes from the rib-bearing surface of the backing, the less adhesive is required to coat the backing. The more each rib protrudes from the backing, the less release coat material, if any, is required to coat the backing.

The ratio of the thickness of the rib to the thickness of the backing (as viewed from FIG. 1) can range from 2:1 to 0.05:1, preferably 1.5:1 to 0.25:1.

Figure 9:
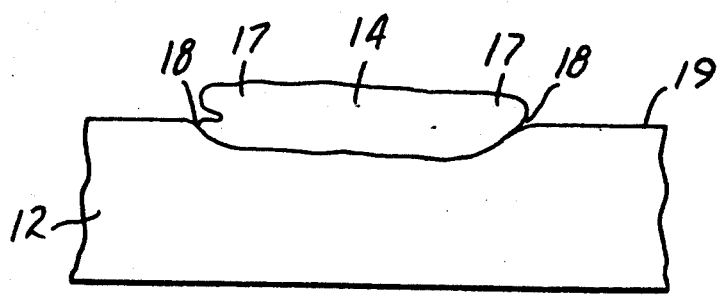
FIG. 9 shows an enlarged schematic view of a rib embedded in the backing of the tape of the present invention.

Upon microscopic analysis of the tape (see FIGS. 9, 10, and 11), it was discovered that a small portion of rib 14 is not in contact with backing 12. This is in contrast to the tape depicted in FIG. 12, which shows a rib-bearing tape that can be treated by the method of this invention to form the tape of this invention. In the rib-bearing tape of FIG. 12, the ribs are merely fused to the backing and are not embedded in the backing. At each end 17 of rib 14, there is a small, notch-like separation 18 between end 17 of rib 14 and surface 19 of backing 12. The presence of this separation is associated with the improved cross-direction tear resistance of the tape of this invention. As used herein, the term "end" when referring to a rib means the portion of a rib that is tangent to a line perpendicular to the surface of the backing. Because of the nature of the embedding process described herein, wherein embedding of the ribs is effected by a calendering process, the ribs are caused to have an elliptical shape (see FIGS. 9, 10, and 11). Accordingly, each end 17 of rib 14 is characterized by a smooth curve, rather than a point.

Before orienting of the tape, the ribs typically have a substantially circular cross-section or an "omega" ($\Omega$) shaped cross-section, depending upon the shape of the die orifice openings. After orienting, the cross-section of the ribs often becomes distorted; for example, it may flatten, elongate, or vary in some other manner. In tapes of this invention, wherein the ribs are prepared by means of extrusion, the ribs tend to fuse to the backing, regardless of whether the backing is pre-formed or coextruded with the ribs. Upon fusing, part of the mass of the ribs flows into the space between the ribs, thereby distorting the original cross-section of the ribs, i.e., the original cross-section as viewed immediately upon emerging from the extrusion die. When the fused ribs are embedded in the backing, they must be embedded in such a way that further fusion of the ribs and backing is prevented. It is preferred that the ribs not be embedded into the backing to such a depth that the cross-direction tear resistance of the backing is reduced. The preferred depth of embedding is dependent upon the thickness of the backing and the dimensions of the cross-section of the ribs.

Adhesives that can be used for adhesive layer 16 include, for example, pressure-sensitive adhesives and hot-melt adhesives. Pressure-sensitive adhesives are preferred for the present invention. Pressure-sensitive adhesives are well-known to those of ordinary skill in the tape art and are described in *Encyclopedia of Polymer Science and Technology*, Vol. 1, Interscience Publishers (New York:1964), pp. 445–550, incorporated herein by reference. Representative examples of pressure-sensitive adhesives suitable for this invention include acrylates, resin-tackified natural rubber adhesives, and tackified block copolymers.

An optional low adhesion backsize layer 18 can be coated onto the major surface of backing 12 opposite the surface bearing the adhesive. Low adhesion backsizes are known to one of ordinary skill in the art and are described, for example, in U.S. Pat. Nos. 2,532,011, 2,607,711, and 3,318,852, all of which are incorporated herein by reference.

The total weight of the tape can be similar to the total weight of conventional thermally-adhesive or pressure-sensitive adhesive tapes, generally from about 50 g/m² to about 400 g/m², preferably 100 g/m² to 350 g/m².

The tensile strength at break of the tape preferably exceeds 1750N/100 mm, and preferably ranges from about 1750N/100 mm to about 7500N/100 mm. Elongation preferably ranges from 10 to 50%, more preferably from 10 to 30%.

Cross-direction tear resistance is significantly improved by the notch-like separation between the surface of the backing and each end of each rib. Cross-direction tear resistance preferably exceeds 3 lbs. force (13.34N).

Tape unwind preferably ranges from 5.5 to 44.0N/100 mm. Adhesion to steel preferably exceeds 32.8 N/100 mm.

The tape of this invention has numerous advantages over tape of the prior art. Because the ribs are not adhered to the backing by pressure-sensitive adhesives, drying ovens are not needed for processing the adhesive used to adhere conventional filaments to a backing. Furthermore, there is no need for primer coats to adhere the ribs to the backing. Many of the problems that arise because of the use of filaments are eliminated, such as, for example, lifting, separation, puckering, cockling of filaments, or spiraling of tape. The tape can be made to have a uniform appearance, because the shape and size of the ribs can be easily controlled.

The tape of this invention can be made to have a tensile strength comparable to that of a conventional filament-reinforced tape and comparable to that of a tape that is flat and that has been tensilized in the machine direction. The tape of this invention exhibits advantage over that of an oriented flat tape construction in that it provides for very good cross-direction tear resistance due to the resistance provided by the substantially longitudinal ribs. As used herein, the term "cross-direction" means the dimension at right angles to the machine direction of a sheet of tape. The term "machine direction" means the circumferential direction of a roll of tape. The tape of this invention is at least 100% stronger than an oriented flat tape, when either has been cut or nicked in the cross-direction. The resistance provided by the ribs inhibits tear propagation across the remaining portion of the cross-direction. A flat, tensilized film, when nicked or cut, will tear immediately across the cross-direction of the film placed under tension.

The tape of this invention exhibits advantages over glass-reinforced tapes when torn in the cross-direction because, unlike glass-reinforced tapes, it does not suffer from a glass-to-glass abrasion factor. This abrasion factor is present within an individual yarn and between adjacent yarns. Glass-reinforced tapes may tear all the way across the tape in the cross-direction due to this abrasion phenomenon. The tape of this invention will tend to fracture in the machine or longitudinal direction when torn in the cross-direction. When comparing the tape of this invention with glass-reinforced tapes, the value of cross-tear resistance may be higher for the glass-reinforced tapes. This value, as measured by the cross-direction tear method outlined in the test method section described below, can be misleading due to the inability to make accurate measurements of tear resistance force values from the "Instron" chart recorder, because the better modes of tape of this invention will always fracture in the machine (longitudinal) direction and the poorer modes will propagate a tear in the cross-direction of the specimen under test.

The cost of the tape of this invention is lower than that of filament-reinforced tape of the prior art, typically amounting to only about 50% of the cost, chiefly on account of the unique method of processing and elimination of the high cost of purchasing the filaments and applying them to a backing. The product of this invention eliminates much of the cost arising from the expected tape defects resulting from necessary treatments of raw materials prior to their introduction into tape-making equipment and additional converting that is required before raw materials can be combined into a tape product.

It is preferred to make the tape of this invention by means of a coextrusion process for the following reasons: (1) the tape can be made in a single processing step by means of coextruding ribs and backing, embedding the ribs below the surface of the backing, and applying adhesive and release coats; (2) there is no additional high cost associated with the purchase of the raw materials and additional processing that is required to make a conventional filament-reinforced tape product; (3) the tape produced according to a coextrusion process to form a complete rib-bearing tape does not require synthetic or natural filaments, which typically need additional treatment to bond them to a backing or carrier; (4) the tape formed by a coextrusion process is uniform and consistent. It is not prone to some of the major defects that plague a conventional filament-reinforced tape, e.g., tape areas devoid of filaments due to yarn handling problems, cockling, buckling due to tension related differences when combining filaments with a film backing; and (5) the tape can be produced with physical properties that are equal or superior to products produced using prior art techniques.

Figure 5:
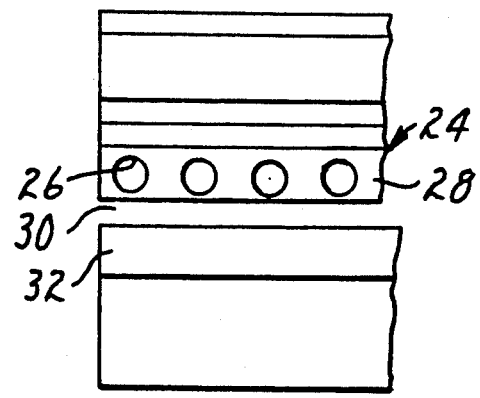
FIG. 5 shows an enlarged front-elevational view of a portion of the die of FIG. 4 having tubular orifices.
Figure 4:
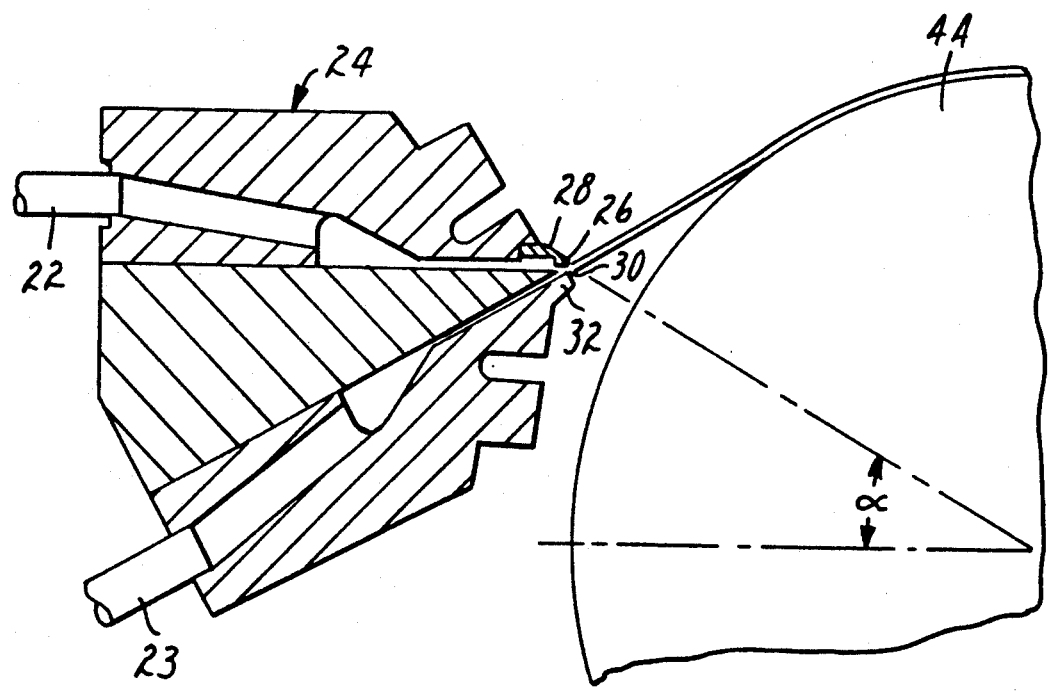
FIG. 4 shows a cross-sectional view of the coextrusion die of FIG. 2.

The tape of this invention is most preferably prepared by means of coextrusion techniques. Referring to FIGS. 2 and 4, two conventional extruders 20, 21 are shown. Neck tubes 22, 23 connect extruders 20, 21, respectively, to dual manifold die 24. Referring to FIG. 5, die 24 has a series of closely spaced orifices 26 on the top portion 28 thereof and a slot orifice 30 on the bottom portion 32 thereof, with the line of closely spaced orifices extending parallel to the elongated side of the slot orifice. The shape of these closely spaced orifices determine the shape of the ribs after extrusion and are preferably circular in cross-section. The diameters of the openings of these orifices, the height of the slot orifice, and the distance between the orifices are important parameters and can affect product performance. The distance between the bottoms of closely spaced orifices 26 and the top of slot orifice 30 is generally set at about 0.005 inch (0.0127 mm) to ensure a good bond between the ribs and the backing. If the distance becomes too large, e.g., greater than 0.010 inch (0.0254 mm), excessive cooling of the molten materials can occur before a good bond between the ribs and backing can be achieved. If the distance is too small, e.g., less than 0.003 inch (0.00762 mm), the ribs can excessively flow across the surface of the backing and the cross-tear resistance of the final tape product will decrease.

The raw materials, usually in the form of pellets, are first introduced into extruders 20, 21, then melted at their individual melting temperatures, and finally fed by way of neck tubes 22, 23, respectively, into dual manifold extrusion die 24, each stream of raw materials independent of the other. The temperature of both extruders and the die typically exceeds the melting temperatures of the raw materials. The material for forming the backing is fed into slot orifice 30 while simultaneously the material for forming the ribs is fed into the series of closely spaced orifices 26. For the backing forming composition, polymeric material, e.g., polypropylene or polyvinyl alcohol, can be used. For the rib-forming composition, polymeric material, e.g., low density polyethylene, polypropylene, and optionally, a pigment, e.g., titanium dioxide, are used. Pigment is preferably used so that the ultimate user of the tape can better visually observe the ribs. However, the tape or this invention does not require that the ribs be pigmented. The output ratio of the backing-forming extruder to the rib-forming extruder is typically established in a range of 1.5:1 to 8:1, based on the weight of the materials. This range contemplates a tape having about 25 ribs per inch width of backing. This range should be changed if the number of ribs per inch width of backing is changed. The value of the end points of the range vary directly with the number of ribs per inch width of backing. As the extruders leave dual manifold die 24 in the molten state, they are immediately combined to form the rib-bearing article (see FIGS. 3 and 4). It should be noted that the combining of the rib-forming material and the backing-forming material is facilitated by gravity.

Figure 6:
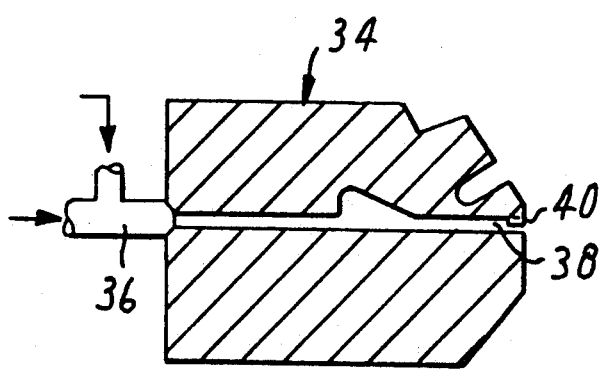
FIG. 6 shows a cross-sectional view of a second embodiment of a die useful in the present invention.
Figure 7:
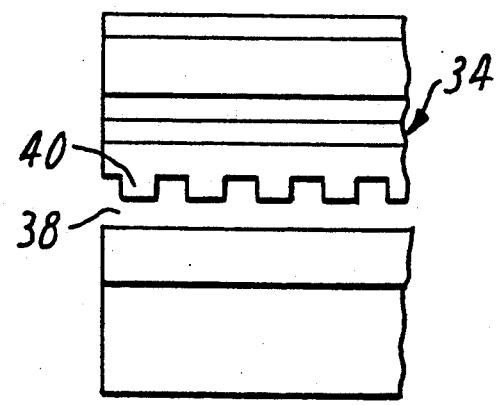
FIG. 7 shows an enlarged front-elevational view of a portion of the die of FIG. 6 having a notched orifice.

While a dual manifold die is preferred, the tape of this invention can also be prepared by a less preferred, alternative method. If the backing-forming material and the rib-forming material have a similar melting point range, they can be brought together outside a die 34 in a combining manifold 36 where the molten compositions are joined and extruded through a single die orifice 38 (see FIG. 6) to form the rib-bearing article. A single die orifice 38 comprising a plurality of notches 40 and an elongated slot is shown in FIG. 7. Difference in the melting point and viscoelastic characteristics of the backing-forming material and the rib-forming material may dictate that the materials be brought into separate manifolds with parallel die slots so that they emerge separately but are then immediately drawn together to form the rib-bearing article. For coextrusion through a single manifold die, the temperature difference of the materials can be as great as 30° C., but are preferably close to 20° C. When a dual manifold die is employed, the temperature difference between materials can be as great as 50° C. In the present invention, it is preferred that a dual manifold coextrusion die be used even if the melting ranges are similar so as to achieve optimum results.

When the material output rate increases in the die that is feeding polymeric material to form the ribs, the thickness of the ribs increases. In many cases, tapes having thicker ribs provide higher cross-direction tear resistances. Neither die output rate nor ratio of backing-to-rib alone is sufficient to predict the final strength of the tape. If the material output rate of the rib-forming die is excessive, then material extraneous to the ribs will be extruded onto the surface of the backing between the ribs. This is known as die leakage and often results in poorer performance.

Referring now to FIG. 3, the rib-bearing article is then drawn towards a chilled casting roll 44, which is running at a pre-determined velocity, and flash cooled from a molten state to a solidified state. For polypropylene, casting roll 44 is maintained at a temperature of between 21° C. and 72° C. This temperature can differ for polymeric materials other than polypropylene. Tackdown of the web to casting roll 44 can be accomplished by means of either air knife or electrostatic pinning. It is preferred that the die be placed so that the web emerges therefrom parallel to the horizontal center line of casting roll 44.

One can vary the flow rates, extrusion rates, extrusion temperatures, or the shape of the die orifices openings. One can also vary the angle of deflection of the extrudate by repositioning the die with respect to casting roll 44 or by varying the velocity of casting roll 44.

As used herein, the term "velocity", when used with reference to any type of roll in the tape-making apparatus described herein, refers to the linear velocity of a point on the surface of the roll; the term "velocity" does not refer to revolutions per unit of time. The velocity of roll 44 is controlled so that the rib-bearing article emerging from extrusion die 24 is not distorted. The velocity of roll 4 is usually set to match the throughput rate of the polymer emerging from slot orifice 30 to obtain a product of desired thickness. When the velocity drops too low, the material being extruded will pile up on casting roll 44, creating a heavy sheet, which is undesirable as the tape backing. If the velocity is set too high, the rib-bearing article will be reduced in width and thickness, which is also undesirable.

Regardless of the manner in which the web is formed, the rib-bearing article is preferably stretched to provide orientation in the machine direction. As the rib-bearing article leaves roll 44, it traverses idler roll 46, and then it traverses one or more preheating rolls 48 leading to the stretching station or orienting station 52 as shown in FIG. 3. The rib-bearing article is preheated preferably to a temperature approaching the softening point thereof by means of preheating rolls 48. The temperature range for this step is preferably within the range of 110° C. to 166° C. for polypropylene. Orienting station 52 comprises a heated roll 54 and a pull roll 56.

Heated roll 54 runs at the same speed as casting roll 44 and preheating roll 48. Pull roll 56, which runs at a higher constant velocity than heated roll 54, mechanically stretches the rib-bearing article to produce a thinner article having desired thickness and mechanical properties, while maintaining the characteristic structure of the article. For polypropylene, an example of a typical velocity for pull roll 56 is 15.0 m/min; an example of a typical velocity for casting roll 44 is 3 m/min.

If the velocity of heated roll 54 is $V_1$, the thickness of the rib-bearing article is $T_1$, and the velocity of pull roll 56 is $V_2$, the final thickness of the rib-bearing article, $T_2$, is approximately equal to $(V_1/V_2) T_1$. This does not take into account reduction in width of the rib-bearing article.

Heated rolls 58, 60 operate to cool the web to a lower temperature in order to allow relaxation of the rib-bearing article.

While not required, the system in FIG. 3 includes an additional stretching station or orienting station 62. Prior to entering orienting station 62, the rib-bearing article is heated preferably to a temperature approaching the softening point of backing 12 by means of heated roll 64. The temperature range for this step is preferably within the range of 110° C. to 166° C. for polypropylene. Orienting station 62 comprises heated roll 66 and a pair of pull rolls 68 and 70. Heated roll 66 operates at a lower velocity than do pull rolls 68 and 70.

At the conclusion of stretching or orienting, the rib-bearing article is passed over a heated roll 72 in order to allow additional relaxation of the rib-bearing article to provide dimensional stability.

After the machine direction orientation step or steps and the relaxation step or steps, the rib-bearing article can be treated according to other conventional processes. For example, reference numeral 74 depicts apparatus that can be used to remove extraneous beads of material from the rib-bearing article and wind the rib-bearing article onto a core 76 to make a roll of tape.

Figure 8:
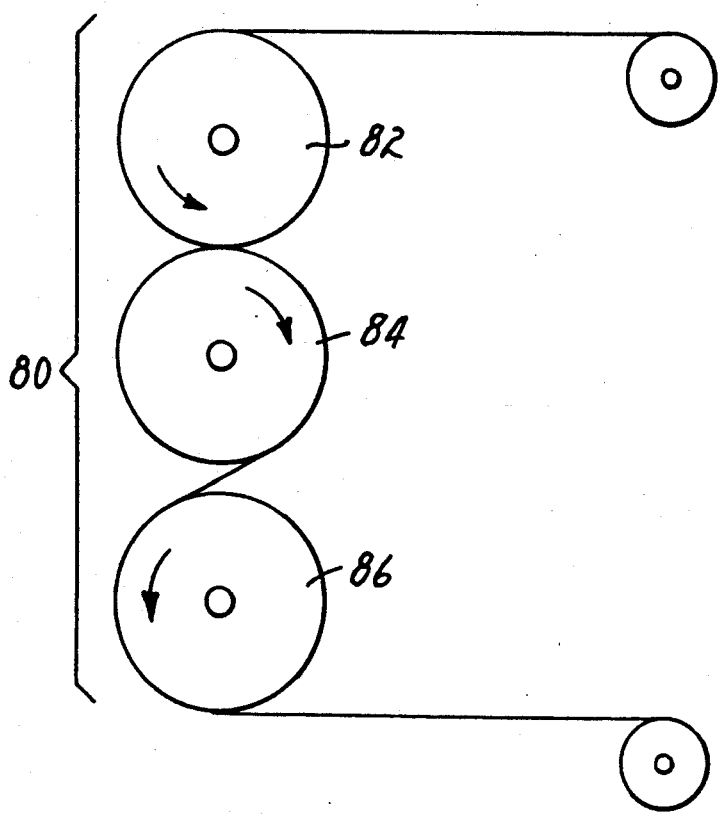
FIG. 8 shows a schematic diagram of the system used to calender the tape of the present invention.

The ribs are preferably embedded into the backing prior to application of the adhesive layer and the low adhesion backsize layer, if used. Embedding involves softening backing 12 by heating and passing the rib-bearing, oriented tape through one or more nips between metal rolls to force ribs 14 below the rib-bearing surface of backing 12 to the desired depth. A typical embedding apparatus is shown in FIG. 8, which depicts a three roll vertical calender 80, consisting of a top roll 82, a center roll 84, and a bottom roll 86. In the apparatus shown, embedding is effected at the nip between top roll 82 and center roll 84. For the purpose of the present invention, it is preferred to conduct the embedding operation after the rib-bearing, oriented tape has the extraneous beads of material removed therefrom.

The major surface of backing 12 not bearing ribs 14 is heated by heated roll 82 sufficiently to soften backing 12. Then the rib-bearing tape, with its backing softened, is passed between rolls 82 and 84. The pressure generated at the nip between rolls 82 and 84 forces ribs 14 to become embedded in backing 12 but not to fuse with backing 12. Ribs 14 should be embedded in backing 12 to a depth sufficient to form a notch-like separation 18 between the rib-bearing surface 19 of backing 12 and each end 17 of rib 14.

During the embedding step, care must be taken so that the backing is softened but the ribs are not. This will allow a major portion of the ribs to be forced beneath the surface of the backing and will further allow the ends of the ribs to be slightly separated from the surface of the backing. This will also avoid (a) a continuous transition from the end of the rib to the surface of the backing, and (b) excessive spread of the material of the rib along the surface of the backing. It is to be understood that the initial bond between the rib and the backing must be sufficiently strong so that the embedded rib will remain bonded to the backing during storage and use.

In general, embedding the ribs to such a degree so as to form a notch-like separation between each end of the rib and the surface of the backing increases cross-tear resistance of the backing.

After the ribs are embedded in the backing, they can be flattened to reduce the degree of protrusion of the ribs relative to the surface of the backing.

A layer of adhesive can be applied over either major surface of the backing. While it is preferred to apply the layer of adhesive immediately after the embedding step, it is also acceptable to apply the layer of adhesive as the ribs and backing are emerging from the extrusion die or dies. Alternatively, the layer of adhesive can be applied on a different assembly line after the article has been oriented, beads of materials removed therefrom, the ribs embedded, and the article wound upon a core. The precise point of application of the layer of adhesive depends heavily on economic considerations. The point of application of the optional low adhesion backsize layer also depends a great deal on economic considerations. The low adhesion backsize layer can be applied prior to, subsequent to, or at the same time as application of the adhesive layer.

The adhesive-coated, rib-bearing article can then be slit and wound in a conventional manner to form rolls of tape.

The tape is generally supplied to the user unsupported, for instance as a reel, but if desired may be supplied to the user while supported on a release liner. The tape can be of conventional width or can be narrower.

The following methods were used to evaluate the tapes made in accordance with this invention.

Test Methods

Cross-Direction Tear Resistance

The cross-direction tear strength was measured with an "Instron" tensile tester (available from Instron Company). The machine was set to utilize a crosshead speed of 20 in/min (50.8 cm/min), a jaw separation of 2 inches (5.08 cm), and a chart speed of 20 in/min (50.8 cm/min). The load cell used is designated as the DR cell and is capable of recording a stress of 1000 lbs maximum. The setting selection for the testing of the product of this invention was a 200 lb maximum load setting.

Preparation of the sample

Strips of tape were cut in the machine longitudinal direction (MD) to a 1.5 inches (3.8 cm) width. The sample length was 6.0 inches (15.2 cm). A "plexiglass" jig, cut in the shape of a triangle, was used to mark two lines at 40° angles, opposing the machine direction, across the 1.5 inches (3.81 cm) by 6.0 inches (15.2 cm) tape sample. On one side of the sample, there marks were 2.0 inches (5.08 cm) apart, while on the other they were approximately b 4.56 inches (11.6 cm) apart. On the short side of the marked sample (2.0 inches) a nick, one-quarter inch (0.63 cm) in length, was cut into the tape across the ribs with a razor blade directly at the center between the aforementioned marks. The sample was then ready for testing.

Procedure

The prepared sample was placed into the jaws of the tensile tester. The two reference marks were used to align the sample within the jaws so that the alignment was completed with the marks parallel to each jaw. As a result, the sample to be tested formed a natural bend on one edge of the tape and was straight on the other edge of the tape. The straight side was the side which had been cut as described in the sample preparation section. The straight side was the aforementioned short side. At initiation of applied stress, the sample was forced to tear in the cross-direction. The chart recorded the value in pounds of stress at fracture of the sample. Pounds were converted to Newtons (N).

Measurement of Results

On all samples, the highest value from the chart recorder was taken into account along with a subjective rating of the type of failure that occurred. The excellent samples (ones that do not tear in the cross-direction) always tear either up or down (in the machine direction) into the jaw. The marginal samples will first tear in the machine direction, then in the cross-direction (in this case the result is achieved when the tear in the machine direction reaches the jaw). The poor samples immediately tear across the specimen in the cross-direction. Observations of the type of failure using a subjective rating value of 1 for excellent material, 3 for marginal material, and 5 for material not passing the cross-direction tear resistance test were also recorded.

The reason for including a subjective rating system is that the excellent samples are very difficult to evaluate, because they always tear in the machine direction and the test must be stopped due to the fracture of the sample being sheared by the jaw. At the same time the cross-direction tear test is being performed, observations are made as to the type of fracture, and whether the bond of the ribs to the backing is adequate. The same type of rating system is used to determine this response.

The following non-limiting examples will further illustrate the present invention.

Preparation of Rolls for Control, Examples I, II, Comparative Example I, and Comparative Example II Preparation of Control Roll A This preparation involved a coextrusion die 24 which contained, in the top portion 28 thereof, a series of holes 26 machined through the face of die 24 in a straight line parallel to the direction of the material flow. Holes 24 were spaced 0.040 inch (0.102 cm) on center and were 0.020 inch (0.051 cm) in diameter. Top portion 28 of die 24 was 10 inches (25.4 cm) wide and contained 25 of the aforementioned holes per inch of width. The perpendicular distance from the lowermost portion of each hole 26 to the lowermost point of top portion 28 was 0.005 inch (0.013 cm). The bottom orifice 30 consisted of a slot 10 inches (25.4 cm) wide and 0.025 inch (0.064 cm) high.

During the initial set up of the apparatus, extrusion die 24 was placed approximately 32° (i.e., 10 o'clock to 11 0'clock) from the horizontal center line of the chilled casting roll 44. Die 24 was placed in a position such that the extrudate emerged at an angle of 0° from the horizontal.

Two extruders 20, 21 were used to feed coextrusion die 24, one to feed a blend of virgin polypropylene resin (from FINA Cosden Chemical Division) blended with a pigment concentrate (from C. B. Edwards, Type 101p) at a mixture of 98% polypropylene and 2% pigment into the top manifold and through the top portion 28 containing holes 26 to form the ribs of the tape. The backing-to-rib ratio, based on weight of feed, was 4.5:1.

The other extruder fed the bottom manifold leading to slot orifice 30 with raw virgin polypropylene resin only to form the backing of the tape.

During the extrusion process, the two extruders 20, 21 were run simultaneously. The temperature in top extruder 20 was 271° C. and in bottom extruder 21 was 254° C. The temperature of die 24 was 271° C.

The ribs and backing were combined upon exit from die 24. At this point, the ribs and backing were immediately bonded while both were in the molten state and then drawn from the die with the aid of chilled casting roll 44.

Since chilled casting roll 44 was colder (40° C.) than the molten material, the material was solidified into a sheet which contained ribs on a backing. This sheet was pinned to chilled casting roll 44 by means of an electrostatic pinning wire. The molten material was solidified and cooled solely by chilled casting roll 44. Upon exiting chilled casting roll 44, the material was oriented in the machine direction by means of a two-stage orienting process. In the first stage, the material was preheated by a series of rolls 48 (in this case, six rolls were used) to a temperature of 113° C. The material then entered a pair of heated stretching rolls 54, 56 maintained at temperatures of 110° C. The speed of stretching roll 54 was the same as that of the casting roll 44, i.e., 3 m/min. The speed of stretching roll 56 was 15 m/min. Rolls 54, 56 stretched the material at a stretch ratio of 5:1. The oriented web was cooled by means of heated cooling rolls 58, 60 maintained at 99° C. In the second stage, the cooled, oriented web was then preheated by roll 64 and stretched to a total stretch ratio of 7:1 by means of rolls 66, 68, and 70 of orienting station 62. Roll 64 was maintained at 160° C. The speed of stretching roll 70 was 21 m/min; rolls 66, 68, and 70 were maintained at temperatures of 160° C. After orientation, the material was annealed at a temperature of 91° C. for four seconds on an annealing roll 72. Extraneous beads at the edges of the rib-bearing article were removed by apparatus 74. The rib-bearing article was trimmed to six inches in width then wound onto core 76 to make a roll of tape.

This roll of tape, which did not bear an adhesive layer or low adhesion backside layer, was then tested for physical properties. Tensile strength was 185 lbs/in at break (3240 N/100 mm), surface caliper was 0.0072 inch (0.0183 cm), tape weight was 3.60 g/72 sq. in., peak value of cross-direction tear was 12.0 lbs, average value of cross-direction tear was 9.0 lbs, cross-directional tear rating had a value of 3.7. the bond of the ribs to the backing was good. This roll, hereinafter designated Roll A, was the control Roll A was cut into four smaller rolls, each of the smaller rolls having the same tape width as Roll A. These four rolls were designated Roll B, Roll C, Roll D, and Roll E.

EXAMPLE I

Embedding was carried out by means of a three roll vertical calender 80, as shown in FIG. 8. Calender 80 comprised a top roll 82, a center roll 84, and a bottom roll 86.

The nip between top roll 82 and center roll 84 was set at a distance of approximately 0.004 inch. The speed of the tape (Roll B) in this example was set at 5 ft/min (1.524 m/min).

The tape was introduced into calender 80 at top roll 82. The surface of the tape not bearing ribs was then heated by top roll 82 to soften the material thereof to facilitate embedding. The temperature of the surface of top roll 82 was 149° C. The temperature of the surface of center roll 84 was 200° F. (93° C.). Embedding was effected at the nip between top roll 82 and center roll 84. The nip opening between top roll 82 and center roll 84 was set such that the tape was calendered to an average caliper of about 0.0045 inch (0.0114 cm).

The surface temperature of bottom roll 86 was set at 90° F. (32° C.) to cool the tape before it was rewound into a roll to minimize curling. A layer of pressure-sensitive adhesive and an optional low adhesion backsize layer can be applied to the tape on a separate line in a separate operation.

After leaving bottom roll 86 of calender 80, the calendered tape was rewound into a roll and tested for physical properties.

EXAMPLE II

The procedure of Example I was repeated with the exception that the speed of the tape (Roll C) was set at 25 ft/min (7.62 m/min).

COMPARATIVE EXAMPLE I

The procedure of Example I was repeated with the exception that the rib-bearing surface of the tape (Roll D) was heated by top roll 82 to flatten the ribs by means of calendering.

COMPARATIVE EXAMPLE II

The procedure of Example I was repeated with the exception that the rib-bearing surface of the tape (Roll E) was heated by top roll 82 to flatten the ribs by means of calendering.

The tapes of Rolls A, B, C, D and E were tested and the results set forth in Table 1.

TABLE 1

| Example no. | Roll designation | Cross-direction tear (peak) (lbs) | (N) | Cross-direction tear (average) (lbs) | (N) | Bond rating | Cross-direction tear-rating | Tensile (lbs/in) | (N/100 mm) |
| --- | --- | --- | --- | --- | --- | --- | --- | --- | --- |
| Control | A | 12.0 | 53 | 9.0 | 40 | 1.3 | 3.7 | 185.0 | 3240 |
| Comparative I | D | 13.3 | 59 | 7.7 | 34 | 1.0 | 2.3 | 184.0 | 3222 |
| Comparative II | E | 12.7 | 57 | 8.3 | 37 | 1.3 | 2.3 | 198.0 | 3468 |
| I | B | 25.7 | 114 | 17.3 | 77 | 1.0 | 1.3 | 186.0 | 3257 |
| II | C | 35.7 | 159 | 23.0 | 102 | 1.0 | 1.7 | 198.7 | 3480 |

The tapes of Examples I (Roll B) and II (Roll C) exhibited significant increases with respect to cross-direction tear (peak) and cross-direction tear (average) when compared with the tapes of Comparative Examples I (Roll D) and II (Roll E). There was no indication that speed of the tape during calendering or embedding had a significant effect on cross-direction tear.

Preparation of Rolls for Control, Examples III, IV, V, and VI

Preparation of Control Roll F

A control roll, hereinafter designated Roll F, was prepared in the same manner as was Roll A, with the exception that the backing-to-rib ratio, based on weight of feed, was changed from 4.5:1 to 3.3:1. The effect of this change was to produce a tape having larger ribs.

Rolls for use in Examples III, IV, V, and VI were prepared in the same manner as were Rolls B, C, D, E, i.e., Roll F was cut into four smaller rolls, each of the smaller rolls having the same tape width as Roll F. These four rolls were designated Roll G, Roll H, Roll J, and Roll K.

EXAMPLES III, IV, V

The rolls of tape of these examples, i.e., Rolls G, H, J, were treated in the same manner as the roll of tape in Example II, with the exceptions that the calender rolls were maintained at temperatures as set forth in Table 2. The speed of the tape during calendering was set at 25 ft/min (7.62 m/min).

TABLE 2

| Example no. | Roll designation | Temperature (°C.) Roll 82 | Roll 84 | Roll 86 |
| --- | --- | --- | --- | --- |
| III | G | 149 | 149 | 32 |
| IV | H | 121 | 121 | 32 |
| V | J | 121 | 66 | 32 |

EXAMPLE VI

The roll of tape of this example (Roll K) was treated in the same manner as the roll of tape in Example II, with the exception that calender rolls were maintained at the following temperatures.

| Roll no. | Temperature (°C.) |
| --- | --- |
| 82 | 149 |
| 84 | 66 |
| 86 | 32 |

The tapes of Rolls F, G, H, J, and K were tested and the results set forth in Table 3.

TABLE 3

| Example no. | Roll designation | Cross-direction tear (peak) (lbs) | (N) | Cross-direction tear (average) (lbs) | (N) | Bond rating | Cross-direction tear-rating | Tensile (lbs/in) | (N/100 mm) |
| --- | --- | --- | --- | --- | --- | --- | --- | --- | --- |
| Control | F | 23.0 | 102 | 16.0 | 71 | 1.0 | 3.0 | 219.3 | 3835 |
| III | G | 29.0 | 129 | 20.0 | 89 | 1.0 | 1.0 | 184.7 | 3235 |
| IV | H | 23.7 | 105 | 20.3 | 90 | 1.0 | 1.0 | 217.0 | 3800 |
| V | J | 27.7 | 123 | 25.0 | 111 | 1.0 | 1.3 | 218.0 | 3818 |
| VI | K | 30.3 | 135 | 18.7 | 83 | 1.0 | 1.0 | 218.3 | 3818 |

The tapes of Examples III, IV, V, and VI exhibited significant increases with respect to cross-direction tear (peak) and cross-direction tear (average) when compared with the tape of the Control.

EXAMPLE VII

Figure 10:
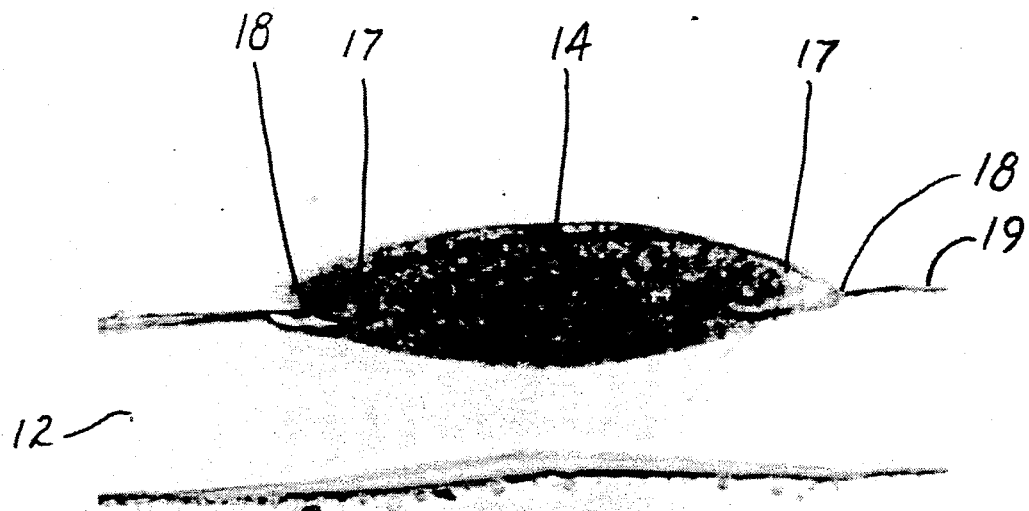
FIG. 10 is a photomicrograph taken at 80× magnification of a cross-section of a rib-bearing article of this invention wherein the ribs are embedded to a depth of about 50% of the diameter of the cross-section of the ribs.

The tape in this example was made according to the procedure described in Example I, with the exceptions that the backing-to-rib ratio, based on weight of feed, was changed from 4.5:1 to 4.0:1, the temperatures in the top extruder and in the bottom extruder were 254° C. and 232° C. respectively, and the temperatures of the top calender roll, the center calender roll, and the bottom calender roll were 149° C., 149° C., and 32° C., respectively. Before embedding, the tape had a cross-direction tear (average) of 7 lbs (31 N); after embedding, the tape had a cross-direction tear (average) of 44 lbs (196 N). The tape weight was 3.33 g/72 sq. in. A photomicrograph (80×magnification) of this tape is shown in FIG. 10. The notch between the backing and the rib can be seen clearly. The embedded ribs have a symmetrical profile with about 50% of the rib extending above the surface of the backing.

EXAMPLE VIII

Figure 11:
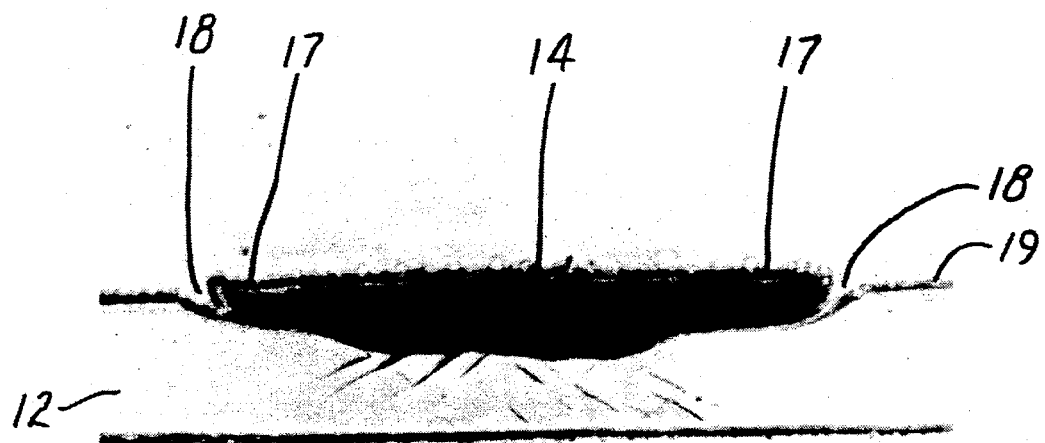
FIG. 11 is a photomicrograph taken at 80× magnification of a cross-section of a rib-bearing article of this invention wherein the ribs are embedded to a depth of more than 90% of the diameter of the cross-section of the ribs.
Figure 12:
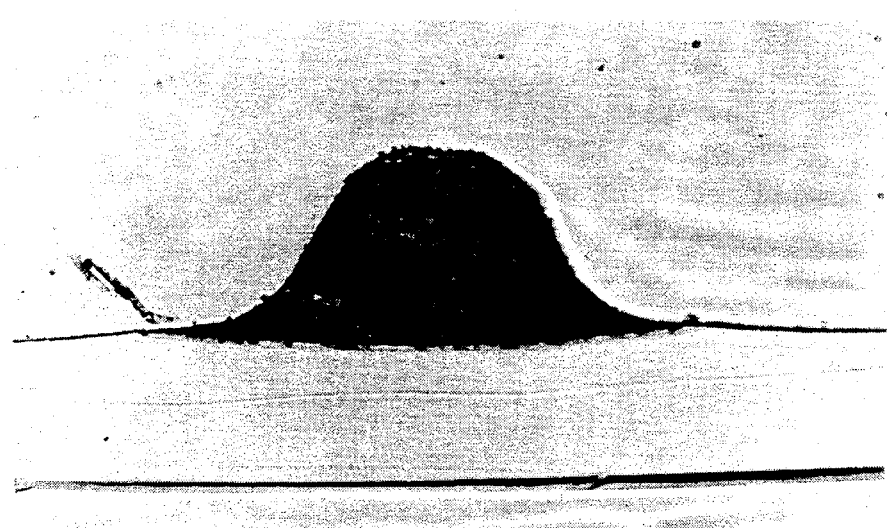
FIG. 12 is a photomicrograph taken at 153× magnification of a cross-section of a rib-bearing article useful for preparing the rib-bearing article of this invention. The ribs of the article of this photomicrograph have not yet been embedded in the backing.

The tape in this example was made according to the procedure described in Example I, with the exception that calendering was conducted according to a sequential process by means of two nips. The ribbed sheet was inserted into the calender, the backing being against the top heated roll as described for the embedding process in Example I. After the embedding step, the sheet continued onward through a second nip between the middle and bottom rolls. The embedded ribs were further flattened in this second step so that their profile barely extended above the backing itself. The temperatures for the top, middle, and bottom calender rolls were 149° C., 149° C., and 32° C., respectively. The tape of this example has the flattest profile possible. Before embedding, the tape had a cross-direction tear (average) of 18 lbs. (80N); after embedding, the tape has a cross-direction tear (average) of 32 lbs (142N). The tape weight was 3.78 g/72 sq. in. A photomicrograph (80×magnification) of this tape is shown in FIG. 11. The notch between the backing and the rib can be seen clearly. The profile of this tape is especially advantageous in that less adhesive is required when coated on the rib side as compared with those tapes that have ribs which protrude from the surface of the backing.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. Method of preparing a tape, which tape comprises a backing bearing a plurality of ribs disposed longitudinally on at least one major surface thereof, said ribs being at least partially embedded in recesses in the surface of said backing such that no more than about 50% of the cross-section of any rib protrudes beyond the rib-bearing surface of said backing, each end of any rib separated from the rib-bearing surface of said backing by a notch, comprising the steps of:
   (1) transporting a first molten resin to a first extrusion die inlet,
   (2) causing said first resin to flow from said first inlet to a first narrow outlet, comprising an elongated slot,
   (3) transporting a second molten resin to a second extrusion die inlet,
   (4) causing said second resin to flow from said second inlet to a second outlet, comprising a plurality of orifices,
   (5) causing said first resin to flow from said first outlet to form said backing,
   (6) causing said second resin to flow from said second outlet to form said ribs,
   (7) causing said ribs to fuse with said backing to form a rib-bearing article,
   (8) softening said backing of said rib-bearing article, and
   (9) at least partially embedding said ribs in said backing such that no more than about 50% of the cross-section of any rib protrudes beyond the rib-bearing surface of said backing, each end of any rib separated from the rib-bearing surface of said backing by a notch.

2. The method of claim 1 further including the step of orienting said article in the machine direction.

3. The method of claim 1 further including the step of applying a layer of adhesive over at least one major surface of said article.

4. The method of claim 1 wherein said embedding of said ribs is effected by passing said rib-bearing article between at least one pair of rolls.

5. Method of preparing rib-bearing article, comprising the steps of:
   (1) transporting a first molten resin to an extrusion die inlet,
   (2) transporting a second molten resin to said extrusion die inlet,
   (3) causing said first molten resin and said second molten resin to flow from said inlet to an outlet comprising an orifice comprising an elongated slot and a plurality of notches,
   (4) causing said first molten resin and said second molten resin to flow from said outlet and to fuse with each other to form a rib-bearing article, comprising a backing bearing a plurality of ribs,
   (5) softening said backing of said rib-bearing article, and (6) at least partially embedding said ribs in said backing such that no more than about 50% of the cross-section of any rib protrudes beyond the rib-bearing surface of said backing, each end of any rib separated from the rib-bearing surface of said backing by a notch.

6. The method of claim 5 further including the step of orienting said article in the machine direction.

7. The method of claim 5 further including the step of applying a layer of adhesive over at least one major surface of said article.

8. The method of claim 5 wherein said embedding of said ribs is effected by passing said rib-bearing article between at least one pair of rolls.

* * * * *

UNITED STATES PATENT AND TRADEMARK OFFICE
CERTIFICATE OF CORRECTION

PATENT NO. : 5,145,544
DATED : September 8, 1992
INVENTOR(S) : Leseman et al.

It is certified that error appears in the above-identified patent and that said Letters Patent is hereby corrected as shown below:

Col. 8, line 12, "20°C" should be --0°C--.

Col. 8, line 42, "orifices" should be --orifice--.

Col 12, line 63, "the" should be --The--.

Signed and Sealed this

Twenty-fifth Day of January, 1994

Attest:

BRUCE LEHMAN

*Attesting Officer*  *Commissioner of Patents and Trademarks*